(12) United States Patent
Weerawarna et al.

(10) Patent No.: US 7,785,710 B2
(45) Date of Patent: *Aug. 31, 2010

(54) SUPERABSORBENT PARTICLES CONTAINING CARBOXYALKYL CELLULOSE AND TEMPORARY METAL CROSSLINKS

(75) Inventors: S. Ananda Weerawarna, Seattle, WA (US); Mengkui Luo, Auburn, WA (US); Alena Michalek, Auburn, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/537,896

(22) Filed: Oct. 2, 2006

(65) Prior Publication Data

US 2008/0081191 A1    Apr. 3, 2008

(51) Int. Cl.
B32B 5/16        (2006.01)
D04H 1/00        (2006.01)

(52) U.S. Cl. .................. 428/402; 428/407; 442/361

(58) Field of Classification Search .............. 428/402, 428/407; 442/361
See application file for complete search history.

(56) References Cited

U.S. PATENT DOCUMENTS

| | | | |
|---|---|---|---|
| 3,645,836 A | 2/1972 | Torr | |
| 4,028,290 A | 6/1977 | Reid | |
| 4,128,692 A | 12/1978 | Reid | |
| 4,143,163 A | 3/1979 | Hutchinson et al. | |
| 4,273,118 A * | 6/1981 | Smith | 604/375 |
| 4,319,956 A | 3/1982 | Snyder et al. | |
| 4,605,401 A | 8/1986 | Chemilir et al. | |
| 4,624,868 A | 11/1986 | Muller | |
| 4,693,713 A | 9/1987 | Chmelir | |
| 4,952,550 A | 8/1990 | Wallach et al. | |
| 4,959,341 A | 9/1990 | Wallach | |
| 5,231,122 A | 7/1993 | Palumbo et al. | |
| 5,425,725 A | 6/1995 | Tanzer et al. | |
| 5,470,964 A | 11/1995 | Qin | |
| 5,498,705 A | 3/1996 | Qin | |
| 5,550,189 A * | 8/1996 | Qin et al. | 525/54.3 |
| 5,612,411 A | 3/1997 | Gross | |
| 5,688,776 A | 11/1997 | Bauer et al. | |
| 5,736,595 A | 4/1998 | Gunther et al. | |
| 5,801,116 A * | 9/1998 | Cottrell et al. | 502/404 |
| 5,847,031 A | 12/1998 | Klimmek et al. | |
| 6,162,541 A | 12/2000 | Chou et al. | |
| 6,296,936 B1 * | 10/2001 | Yahiaoui et al. | 428/378 |
| 6,331,619 B1 * | 12/2001 | Besemer et al. | 536/105 |
| 6,562,743 B1 | 5/2003 | Cook et al. | |
| 6,689,934 B2 | 2/2004 | Dodge, II et al. | |
| 6,713,460 B2 | 3/2004 | Huppe et al. | |
| 6,765,042 B1 | 7/2004 | Thornton et al. | |
| 6,846,924 B1 | 1/2005 | Malmgren et al. | |
| 6,998,367 B2 * | 2/2006 | Qin | 502/400 |
| 7,306,039 B2 * | 12/2007 | Wang et al. | 166/300 |
| 7,321,007 B2 | 1/2008 | Gagliardi et al. | |
| 7,407,912 B2 | 8/2008 | Mertens et al. | |
| 7,455,902 B2 * | 11/2008 | Weerawarna et al. | 428/296.7 |
| 7,541,396 B2 * | 6/2009 | Luo et al. | 524/45 |
| 7,591,891 B2 * | 9/2009 | Weerawarna et al. | 106/140.2 |
| 2003/0027787 A1 | 2/2003 | Couture | |
| 2003/0068944 A1 | 4/2003 | Carlucci et al. | |
| 2003/0144642 A1 | 7/2003 | Dopps et al. | |
| 2003/0232965 A1 * | 12/2003 | Bergeron | 530/300 |
| 2004/0024092 A1 | 2/2004 | Soerens et al. | |
| 2004/0236260 A1 | 11/2004 | Griffiths et al. | |
| 2005/0214541 A1 | 9/2005 | Berrada et al. | |
| 2006/0142477 A1 | 6/2006 | Glasser | |
| 2006/0147689 A1 | 7/2006 | Wallajapet et al. | |
| 2007/0179291 A1 | 8/2007 | Thibodeau et al. | |
| 2008/0009616 A1 | 1/2008 | Frank et al. | |
| 2008/0078514 A1 | 4/2008 | Weerawarna et al. | |
| 2008/0078515 A1 | 4/2008 | Weerawarna et al. | |
| 2008/0079187 A1 | 4/2008 | Weerawarna et al. | |
| 2008/0079188 A1 | 4/2008 | Weerawarna et al. | |
| 2008/0081165 A1 | 4/2008 | Weerawarna et al. | |
| 2008/0081189 A1 | 4/2008 | Weerawarna et al. | |
| 2008/0081190 A1 | 4/2008 | Weerawarna et al. | |
| 2008/0081191 A1 | 4/2008 | Weerawarna et al. | |
| 2008/0081843 A1 | 4/2008 | Weerawarna et al. | |
| 2008/0082064 A1 * | 4/2008 | Luo et al. | 604/367 |
| 2008/0082065 A1 | 4/2008 | Weerawarna et al. | |
| 2008/0082066 A1 * | 4/2008 | Luo et al. | 604/367 |
| 2008/0082067 A1 | 4/2008 | Weerawarna et al. | |
| 2008/0147033 A1 * | 6/2008 | Luo et al. | 604/367 |
| 2008/0314537 A1 * | 12/2008 | Weerawarna et al. | 162/157.6 |
| 2008/0319107 A1 * | 12/2008 | Weerawarna et al. | 524/45 |

FOREIGN PATENT DOCUMENTS

| | | |
|---|---|---|
| WO | WO 00/21581 | 4/2000 |
| WO | WO 2005/123781 | 12/2005 |
| WO | WO 2006/079221 | 8/2006 |
| WO | WO 2006/119638 | 11/2006 |
| WO | WO 2006/119638 A | 11/2006 |

* cited by examiner

Primary Examiner—H. (Holly) T Le
(74) Attorney, Agent, or Firm—John M. Crawford

(57) ABSTRACT

Particles comprising a combination of a carboxyalkyl cellulose and a galactomannan polymer or a glucomannan polymer, wherein the particles comprise a plurality of non-permanent metal crosslinks.

13 Claims, No Drawings

SUPERABSORBENT PARTICLES CONTAINING CARBOXYALKYL CELLULOSE AND TEMPORARY METAL CROSSLINKS

BACKGROUND OF THE INVENTION

Personal care absorbent products, such as infant diapers, adult incontinent pads, and feminine care products, typically contain an absorbent core that includes superabsorbent polymer particles distributed within a fibrous matrix. Superabsorbents are water-swellable, generally water-insoluble absorbent materials having a high absorbent capacity for body fluids. Superabsorbent polymers (SAPs) in common use are mostly derived from acrylic acid, which is itself derived from petroleum oil, a non-renewable raw material. Acrylic acid polymers and SAPs are generally recognized as not being biodegradable. Despite their wide use, some segments of the absorbent products market are concerned about the use of non-renewable petroleum oil derived materials and their non-biodegradable nature. Acrylic acid based polymers also comprise a meaningful portion of the cost structure of diapers and incontinent pads. Users of SAP are interested in lower cost SAPs. The high cost derives in part from the cost structure for the manufacture of acrylic acid which, in turn, depends upon the fluctuating price of petroleum oil. Also, when diapers are discarded after use they normally contain considerably less than their maximum or theoretical content of body fluids. In other words, in terms of their fluid holding capacity, they are "over-designed". This "over-design" constitutes an inefficiency in the use of SAP. The inefficiency results in part from the fact that SAPs are designed to have high gel strength (as demonstrated by high absorbency under load or AUL). The high gel strength (upon swelling) of currently used SAP particles helps them to retain a lot of void space between particles, which is helpful for rapid fluid uptake. However, this high "void volume" simultaneously results in there being a lot of interstitial (between particle) liquid in the product in the saturated state. When there is a lot of interstitial liquid the "rewet" value or "wet feeling" of an absorbent product is compromised.

In personal care absorbent products, U.S. southern pine fluff pulp is commonly used in conjunction with the SAP. This fluff is recognized worldwide as the preferred fiber for absorbent products. The preference is based on the fluff pulp's advantageous high fiber length (about 2.8 mm) and its relative ease of processing from a wetland pulp sheet to an airlaid web. Fluff pulp is also made from renewable and biodegradable cellulose pulp fibers. Compared to SAP, these fibers are inexpensive on a per mass basis, but tend to be more expensive on a per unit of liquid held basis. These fluff pulp fibers mostly absorb within the interstices between fibers. For this reason, a fibrous matrix readily releases acquired liquid on application of pressure. The tendency to release acquired liquid can result in significant skin wetness during use of an absorbent product that includes a core formed exclusively from cellulosic fibers. Such products also tend to leak acquired liquid because liquid is not effectively retained in such a fibrous absorbent core.

Superabsorbent composite particles prepared from renewable natural polymers have advantages over superabsorbent particles obtained from petroleum oil based synthetic polymers in lower cost, biodegradability and being derived from renewable natural polymers. As such there is a need for new superabsorbent compositions derived from renewable natural polymers.

A need therefore exists for a composite superabsorbent material that is simultaneously derived from biodegradable renewable resources like cellulose and that is inexpensive. In this way, the superabsorbent material can be used in absorbent product designs that are efficient. These and other objectives are accomplished by the invention set forth below.

SUMMARY OF THE INVENTION

The invention provides superabsorbent particles that include carboxyalkyl cellulose. The particles include a combination of a carboxyalkyl cellulose and a galactomannan polymer or a glucomannan polymer, and a plurality of non-permanent metal crosslinks.

DETAILED DESCRIPTION OF THE INVENTION

In one aspect, the present invention provides superabsorbent particles that contain carboxyalkyl cellulose. The particles include a combination of a carboxyalkyl cellulose and a galactomannan polymer or a glucomannan polymer, and a plurality of non-permanent metal crosslinks.

The particles include a carboxyalkyl cellulose. Suitable carboxyalkyl celluloses have a degree of carboxyl group substitution of from about 0.3 to about 2.5, and in one embodiment have a degree of carboxyl group substitution of from about 0.5 to about 1.5. In one embodiment, the carboxyalkyl cellulose is carboxymethyl cellulose. The particles include from about 60 to about 99% by weight carboxyalkyl cellulose based on the total weight of carboxyalkyl cellulose and galactomannan or glucomannan polymer. In one embodiment, the particles include from about 80 to about 95% by weight carboxyalkyl cellulose based on the total weight of carboxyalkyl cellulose and galactomannan or glucomannan polymer.

The particles include a galactomannan polymer or a glucomannan polymer. Suitable galactomannan polymers include guar gum, locust bean gum, and tara gum. Suitable glucomannan polymers include konjac gum. The galactomannan polymer or glucomannan polymer can be from natural sources or obtained from genetically-modified plants. The particles include from about 1 to about 20% by weight galactomannan polymer or glucomannan polymer based on the total weight of the carboxyalkyl cellulose and galactomannan or glucomannan polymer, and in one embodiment, the particles include from about 1 to about 15% by weight galactomannan polymer or glucomannan polymer based on the total weight of the carboxyalkyl cellulose and galactomannan or glucomannan polymer.

The particles are substantially insoluble in water while being capable of absorbing water. The particles are rendered water insoluble by a plurality of non-permanent interpolymer metal crosslinks.

The particles have intermolecular metal crosslinks between polymer molecules. The metal crosslink arises as a consequence of an associative interaction (e.g., bonding) between functional groups on the polymers (e.g., carboxy, carboxylate, or hydroxyl groups) and a multi-valent metal species. Suitable multi-valent metal species include metal ions having a valency of three or greater and that are capable of forming an associative interaction with a polymer (e.g., reactive toward associative interaction with the polymer's carboxy, carboxylate, or hydroxyl groups). The polymers are intermolecularly crosslinked when the multi-valent metal species forms an associative interaction with functional groups on two or more polymer molecules. A crosslink may be formed within one polymer molecule or may be formed between two or more polymer molecules. The extent of crosslinking affects the water solubility of the particles and the ability of the particles to swell on contact with an aqueous liquid.

The particles include non-permanent metal crosslinks formed both intermolecularly and intramolecularly in the population of polymer molecules. As used herein, the term "non-permanent crosslink" refers to the metal crosslink formed with two or more functional groups of a polymer molecule (intramolecularly) or formed with two or more functional groups of two or more polymer molecules (intermolecularly). It will be appreciated that the process of dissociating and re-associating (breaking and reforming crosslinks) the multi-valent metal ion and polymer molecules is dynamic and also occurs during liquid acquisition. During water acquisition the individual particles swell and change to gel state. The ability of non-permanent metal crosslinks to dissociate and associate under water acquisition imparts greater freedom to the gels to expand than if it was restrictively crosslinked by permanent crosslinks that do not have the ability to dissociate and reassociate. Covalent organic crosslinks such as ether crosslinks are permanent crosslinks that do not have the ability to dissociate and reassociate.

The crosslinks are formed by treating the carboxyalkyl cellulose and galactomannan or glucomannan polymer with a crosslinking agent. Suitable crosslinking agents include crosslinking agents that are reactive towards hydroxyl groups and carboxyl groups. Representative crosslinking agents include metallic crosslinking agents, such as aluminum (III) compounds, titanium (IV) compounds, bismuth (III) compounds, boron (III) compounds, and zirconium (IV) compounds. The numerals in parentheses in the preceding list of metallic crosslinking agents refers to the valency of the metal.

Representative metallic crosslinking agents include aluminum sulfate; aluminum hydroxide; dihydroxy aluminum acetate (stabilized with boric acid); other aluminum salts of carboxylic acids and inorganic acids; other aluminum complexes, such as Ultrion 8186 from Nalco Company (aluminum chloride hydroxide); boric acid; sodium metaborate; ammonium zirconium carbonate (AZC); zirconium compounds containing inorganic ions organic ions or neutral ligands; bismuth ammonium citrate (BAC); other bismuth salts of carboxylic acids and inorganic acids; titanium (IV) compounds, such as titanium (IV) bis(triethylaminato) bis (isopropoxide) (commercially available from the Dupont Company under the designation Tyzor TE); and other titanates with alkoxide or carboxylate ligands.

The crosslinking agent is effective for intermolecularly crosslinking the carboxyalkyl cellulose (with or without carboxyalkyl hemicellulose) and galactomannan polymer or glucomannan polymer molecules. The crosslinking agent is applied in an amount of from about 0.1 to about 20% by weight based on the total weight of the carboxyalkyl cellulose and galactomannan or glucomannan polymers. The amount of crosslinking agent applied to the polymers will vary depending on the crosslinking agent. In general, the particles have an aluminum content of about 0.04 to about 2.0% by weight based on the weight of the particles for aluminum crosslinked particles, a titanium content of about 0.1 to about 4.5% by weight based on the weight of the particles for titanium crosslinked particles, a zirconium content of about 0.09 to about 6.0% by weight based on the weight of the particles for zirconium crosslinked particles; and a bismuth content of about 0.09 to about 5.0% by weight based on the weight of the particles for bismuth crosslinked particles.

The particles are highly absorptive. The particles have a Free Swell Capacity of from about 30 to about 60 g/g (0.9% saline solution), a Centrifuge Retention Capacity (CRC) of from about 15 to about 35 g/g (0.9% saline solution), and an Absorbency Under Load (AUL) of from about 15 to about 30 g/g (0.9% saline solution).

The particles are water insoluble and water swellable. Water insolubility is imparted by intermolecular crosslinking of the polymer molecules, and water swellability is imparted to the absorbent particles by the presence of carboxylate anions with associated cations. The particles are characterized as having a relatively high liquid absorbent capacity for water (e.g., pure water or aqueous solutions, such as salt solutions or biological solutions such as urine).

The particles are useful as a superabsorbent composition in personal care absorbent products (e.g., infant diapers, feminine care products and adult incontinence products). The particles are useful in a variety of other applications, including, for example, wound dressings, cable wrap, absorbent sheets or bags, and packaging materials.

The preparations of representative superabsorbent particles are described in Examples 1-6. In these examples solutions of a representative carboxyalkyl cellulose and a galactomannan polymer are crosslinked with a metallic crosslinking agent. The composition and liquid absorbent characteristics of representative superabsorbent particles (flakes) are summarized in Table 1. In Table 1, "% wgt total wgt, applied" refers to the amount of crosslinking agent applied to the total weight of CMC and guar gum; "CMC 9H4F" refers to a carboxymethyl cellulose commercially available from Hoechst Celanese under that designation; "PA-CMC" refers to CMC made from northern softwood pulp; "LB Gum" refers to locust bean gum; and "AZC" refers to ammonium zirconium carbonate.

The superabsorbent particles containing carboxyalkyl cellulose can be made by a method that includes the steps of (a) blending a carboxyalkyl cellulose and either a galactomannan polymer or a glucomannan polymer in water to provide an aqueous solution; (b) treating the aqueous solution with a first crosslinking agent to provide a gel; (c) drying the gel to provide a solid; and (d) comminuting the solid to provide a plurality of particles.

In the process, a carboxyalkyl cellulose and either a galactomannan polymer or a glucomannan polymer are blended in water to provide an aqueous solution. In one embodiment, the carboxyalkyl cellulose is carboxymethyl cellulose. The aqueous solution includes from about 60 to about 99% by weight carboxyalkyl cellulose based on the weight of carboxyalkyl cellulose and galactomannan or glucomannan polymers. In one embodiment, the aqueous solution includes from about 80 to about 95% by weight carboxyalkyl cellulose based on the weight of carboxyalkyl cellulose and galactomannan or glucomannan polymers.

The aqueous solution also includes a galactomannan polymer or a glucomannan polymer. The aqueous solution includes from about 1 to about 20% by weight galactomannan polymer or glucomannan polymer based on the weight of the carboxyalkyl cellulose and galactomannan or glucomannan polymers, and in one embodiment, the aqueous solution includes from about 1 to about 15% by weight galactomannan polymer or glucomannan polymer based on the weight of the carboxyalkyl cellulose and galactomannan or glucomannan polymers.

In the method, the aqueous solution including the carboxyalkyl cellulose and galactomannan polymer or glucomannan polymer is treated with a crosslinking agent to provide a gel. Suitable crosslinking agents are described above. The crosslinking agent is applied in an amount of from about 0.1 to about 20% by weight based on the total weight of the carboxyalkyl cellulose and galactomannan or glucomannan polymers. The amount of crosslinking agent applied to the polymers will vary depending on the crosslinking agent.

The gel formed by treating the aqueous solution of a carboxyalkyl cellulose and a galactomannan polymer or glucomannan polymer with the crosslinking agent is then dried to provide a solid that is then comminuted to provide a plurality of particles (superabsorbent particles). In one embodiment, the particles are sieved to obtain particles having a size of from about 150 to about 800 μm. In one embodiment, the particles have a size less than about 800 μm.

Test Methods

Free Swell and Centrifuge Retention Capacities

The materials, procedure, and calculations to determine free swell capacity (g/g) and centrifuge retention capacity (CRC) (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.ne.jp/tokiwa/).

Balance (4 decimal place accuracy, 0.0001 g for air-dried superabsorbent polymer (ADS SAP) and tea bag weights); timer; 1% saline; drip rack with clips (NLM 211); and lab centrifuge (NLM 211, Spin-X spin extractor, model 776S, 3,300 RPM, 120 v).

Test Procedure:

1. Determine solids content of ADS.
2. Pre-weigh tea bags to nearest 0.0001 g and record.
3. Accurately weigh 0.2025 g+/−0.0025 g of test material (SAP), record and place into pre-weighed tea bag (air-dried (AD) bag weight). (ADS weight+AD bag weight=total dry weight).
4. Fold tea bag edge over closing bag.
5. Fill a container (at least 3 inches deep) with at least 2 inches with 1% saline.
6. Hold tea bag (with test sample) flat and shake to distribute test material evenly through bag.
7. Lay tea bag onto surface of saline and start timer.
8. Soak bags for specified time (e.g., 30 minutes).
9. Remove tea bags carefully, being careful not to spill any contents from bags, hang from a clip on drip rack for 3 minutes.
10. Carefully remove each bag, weigh, and record (drip weight).
11. Place tea bags onto centrifuge walls, being careful not to let them touch and careful to balance evenly around wall.
12. Lock down lid and start timer. Spin for 75 seconds.
13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Z=Oven dry SAP wt (g)/Air dry SAP wt (g)
Free Capacity (g/g):

$$\frac{[(\text{drip wt}(g) - \text{dry bag wt}(g)) - (AD\ SAP\ \text{wt}(g))] - (\text{dry bag wt}(g) * 5.78)}{(AD\ SAP\ \text{wt}(g) * Z)}$$

Centrifuge Retention Capacity (g/g):

$$\frac{[\text{centrifuge wt}(g) - \text{dry bag wt}(g) - (AD\ SAP\ \text{wt}(g))] - (\text{dry bag wt}(g) * 0.50)}{(AD\ SAP\ \text{wt} * Z)}$$

Absorbency Under Load (AUL)

The materials, procedure, and calculations to determine AUL were as follows.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate. clamped to stand; 2 L glass bottle with outlet tube near bottom of bottle; rubber stopper with glass tube through the stopper that fits the bottle (air inlet); TYGON tubing; stainless steel rod/plexiglass plunger assembly (71 mm diameter); stainless steel weight with hole drill through to place over plunger (plunger and weight=867 g); VWR 9.0 cm filter papers (Qualitative 413 catalog number 28310-048) cut down to 80 mm size; double-stick SCOTCH tape; and 0.9% saline.

Test Procedure:

1. Level filter set-up with small level.
2. Adjust filter height or fluid level in bottle so that fritted glass filter and saline level in bottle are at same height.
3. Make sure that there are no kinks in tubing or air bubbles in tubing or under fritted glass filter plate.
4. Place filter paper into filter and place stainless steel weight onto filter paper.
5. Wait for 5-10 min while filter paper becomes fully wetted and reaches equilibrium with applied weight.
6. Zero balance.
7. While waiting for filter paper to reach equilibrium prepare plunger with double stick tape on bottom.
8. Place plunger (with tape) onto separate scale and zero scale.
9. Place plunger into dry test material so that a monolayer of material is stuck to the bottom by the double stick tape.
10. Weigh the plunger and test material on zeroed scale and record weight of dry test material (dry material weight 0.15 g+/−0.05 g).
11. Filter paper should be at equilibrium by now, zero scale.
12. Start balance recording software.
13. Remove weight and place plunger and test material into filter assembly.
14. Place weight onto plunger assembly.
15. Wait for test to complete (30 or 60 min)
16. Stop balance recording software.

Calculations:

A=balance reading (g)*−1 (weight of saline absorbed by test material)
B=dry weight of test material (this can be corrected for moisture by multiplying the AD weight by solids %).

$AUL(g/g)=A/B(g\ 1\%\ \text{saline}/1\ g\ \text{test material})$

The following examples are provided for the purpose of illustrating, not limiting, the invention.

EXAMPLES

Example 1

The Preparation of Representative Superabsorbent Particles (Flakes): Ammonium Zirconium Carbonate and Boric Acid Crosslinking In this example, the preparation of representative superabsorbent composite crosslinked with ammonium zirconium carbonate is described.

Prepare a solution of CMC 9H4F 10.0 g OD in 900 ml deionized water with vigorous stirring to obtain a smooth solution. Fully dissolve 0.6 g guar gum in 50 ml DI water and mix well with the CMC solution. Mix the solution for further one hour to allow complete mixing of the two polymers.

Blend the polymer mixture in the blender for 5 minutes. Fully dissolve boric acid 0.1 g in 30 ml DI water. Dilute 2.0 g ammonium zirconium carbonate solution (15% $ZrO_2$) with 20 ml DI water. Transfer ammonium zirconium carbonate solution and boric acid solution to the polymer solution and blend for 5 minutes. Pour the gel into a Teflon coated pan and dry in the oven at 60° C. Grind the dry film in a coffee grinder and sieve. Collect 300-800 μm fraction for testing.

T-bag test for free swell 45.87 g/g; centrifuge capacity 26.11 g/g; and AUL 26.57 g/g (at 0.3 psi) for 0.9% saline solution.

Example 2

The Preparation of Representative Superabsorbent Particles (Flakes): Aluminum Sulfate/Boric Acid Crosslinking In this example, the preparation of representative superabsorbent composite crosslinked with aluminum sulfate and boric acid is described.

Prepare a solution of CMC 9H4F 10.0 g OD in 900 ml deionized water with vigorous stirring to obtain a solution. Dissolve 0.6 g guar gum in 50 ml DI water and mix well with the CMC solution. Mix the solution for further one hour to allow complete mixing of the two polymers.

Blend the polymer mixture in the blender for 5 minutes. Fully dissolve boric acid 0.1 g in 30 ml DI water. Dissolve 0.4 g aluminum sulfate octadecahydrate 20 ml DI water. Transfer boric acid solution and aluminum sulfate solution to the polymer solution and blend for 5 minutes to mix well. Pour the gel into a Teflon coated pan and dry in the oven at 60° C. Grind the dry film in a coffee grinder and sieve. Collect 300-800 μm fraction for testing.

T-bag test for free swell 46.83 g/g; centrifuge capacity 27.35 g/g; and AUL 29.13 g/g (at 0.3 psi) for 0.9% saline solution.

Example 3

The Preparation of Representative Superabsorbent Particles (Flakes): Tyzor TE and Boric Acid Crosslinking In this example, the preparation of representative superabsorbent composite crosslinked with Tyzor TE and boric acid is described.

Prepare a solution of CMC 9H4F 10.0 g OD in 900 ml deionized water with vigorous stirring to obtain a smooth solution. Dissolve 0.6 g guar gum in 50 ml DI water and mix well with the CMC solution. Mix the solution for further one hour to allow complete mixing of the two polymers.

Blend the polymer mixture in the blender for 5 minutes. Dissolve boric acid 0.2 g in 30 ml DI water. Dilute 0.2 g Tyzor TE with 20 ml DI water. Transfer Tyzor TE solution and boric acid solution to the polymer solution and blend for 5 minutes to mix well. Pour the gel into a Teflon coated pan and dry in the oven at 60° C. Grind the dry film in a coffee grinder and sieve. Collect 300-800 μm fraction for testing.

T-bag test for free swell 43.92 g/g; centrifuge capacity 24.46 g/g; and AUL 23.17 g/g (at 0.3 psi.) for 0.9 saline solution.

Example 4

The Preparation of Representative Superabsorbent Particles (Flakes): Aluminum Sulfate and Boric Acid Crosslinking In this example, the preparation of representative superabsorbent composite crosslinked with aluminum sulfate and boric acid is described.

Prepare a solution of CMC 9H4F 10.0 g OD in 900 ml deionized water with vigorous stirring to obtain a solution. Dissolve 0.6 g locust bean gum in 50 ml DI water and mix well with the CMC solution. Mix the solution for further one hour to allow complete mixing of the two polymers.

Blend the polymer mixture in the blender for 5 minutes. Dissolve boric acid 0.1 g in 30 ml DI water. Dissolve 0.6 g aluminum sulfate octadecahydrate in 20 ml DI water. Transfer boric acid solution and aluminum sulfate solution to the polymer solution and blend for 5 minutes to mix well. Pour the gel into a Teflon coated pan and dry in the oven at 60° C. Grind the dry film in a coffee grinder and sieve. Collect 300-800 μm fraction for testing.

T-bag test for free swell 44.62 g/g; centrifuge capacity 25.09 g/g; and AUL 27.66 g/g (at 0.3 psi) for 0.9% saline.

Example 5

The Preparation of Representative Superabsorbent Particles (Flakes): Ammonium Zirconium Carbonate and Boric Acid Crosslinking In this example, the preparation of representative superabsorbent composite crosslinked with ammonium zirconium carbonate is described.

Prepare a solution of CMC 9H4F 10.0 g OD (11.1 g) in 900 ml deionized water with vigorous stirring to obtain a solution. Dissolve 0.6 g locust bean gum in 50 ml DI water and mix well with the CMC solution. Mix the solution for one hour to allow complete mixing of the two polymers.

Blend the polymer mixture in the blender for 5 minutes. Dissolve boric acid 0.1 g in 30 ml DI water. Dilute 2.0 g ammonium zirconium carbonate solution (15% $ZrO_2$) with 20 ml DI water. Transfer ammonium zirconium carbonate and boric acid solution to the polymer solution and blend for 5 minutes to mix well. Pour the gel into a Teflon coated pan and dry in the oven at 60° C. Grind the dry film in a coffee grinder and sieve. Collect 300-800 μm fraction for testing.

T-bag test for free swell 35.58 g/g; centrifuge capacity 19.56 g/g; and AUL 28.8 g/g (at 0.3 psi) for 0.9% saline solution.

Example 6

The Preparation of Representative Superabsorbent Particles (Flakes): Aluminum Acetate and Boric Acid Crosslinking In this example, the preparation of representative superabsorbent composite crosslinked with aluminum acetate and boric acid is described.

Prepare a solution of CMC 9H4F 40.0 g OD in 3600 ml deionized water with vigorous stirring to obtain a solution. Dissolve 2.4 g guar gum in 350 ml DI water and mix well with the CMC solution. Mix the solution for one hour to allow complete mixing of the two polymers.

Dissolve 0.15 g aluminum acetate/boric acid (Aldrich) in 50 ml water. Transfer aluminum acetate/boric acid solution to the polymer solution and blend for 5 minutes to mix well. Pour the gel into a Teflon coated pan and dry in the oven at 60° C. Grind the dry film in a coffee grinder and sieve. Collect 300-800 µm fraction for testing.

T-bag test for free swell 86.79 g/g; centrifuge capacity 65.85 g/g; and AUL 27.66 g/g (at 0.3 psi) for 0.9% saline solution.

In Table 1, Al acetate/boric acid is dihydroxy aluminum acetate•⅓ boric acid from Aldrich Chemical Co.

TABLE 1

Superabsorbent Flakes From Crosslinked Aqueous Mixtures of CMC and Galactomannans

| Sample | CMC | Galactomannan (wgt % total wgt) | Crosslinking agent (wgt % total wgt, applied) | Free Swell (g/g) | CRC (g/g) | AUL (g/g) |
|---|---|---|---|---|---|---|
| 1 | CMC 9H4F | Guar Gum 5.5% | (AZC) Zr 1.38%, $Na_2B_4O_7$ 0.9% | 73.28 | 33.75 | 23.26 |
| 2 | CMC 9H4F | Guar Gum 5.4% | (AZC) Zr 2.72%, $Na_2B_4O_7$ 0.9% | 51.57 | 33.42 | 24.95 |
| 3 | CMC 9H4F | Guar Gum 5.4% | (AZC) Zr 4.0%, $Na_2B_4O_7$ 0.9% | 37.07 | 19.95 | 25.86 |
| 4 | CMC 9H4F | Guar Gum 5.3% | (AZC) Zr 5.3% | 25.79 | 11.1 | 21.93 |
| 5 | CMC 9H4F | Guar Gum 5.5% | (AZC) Zr 1.36%, $B(OH)_3$ 1.8% | 60.02 | 41.41 | 27.4 |
| 6 | CMC 9H4F | Guar Gum 5.4% | (AZC) Zr 1.35%, $B(OH)_3$ 2.7% | 64.29 | 45.82 | 27.04 |
| 7 | CMC 9H4F | Guar Gum 5.4% | (AZC) Zr 2.72%, $B(OH)_3$ 0.9% | 45.87 | 26.11 | 26.57 |
| 8 | CMC 9H4F | Guar Gum 5.5% | (AZC) Zr 2.75% | 47.79 | 28.92 | 27.13 |
| 9 | CMC 9H4F | Guar Gum 5.4% | $Al_2(SO_4)_3$ 2.72%, $B(OH)_3$ 0.9% | 43.81 | 23.08 | 28.02 |
| 10 | CMC 9H4F | Guar Gum 5.4% | $Al_2(SO_4)_3$ 1.83%, $B(OH)_3$ 0.9% | 46.83 | 27.35 | 29.13 |
| 11 | CMC 9H4F | Guar Gum 5.4% | $Al_2(SO_4)_3$ 0.9%, $B(OH)_3$ 0.9% | 64.36 | 51.18 | 27.51 |
| 12 | CMC 9H4F | Guar Gum 5.4% | $Al_2(SO_4)_3$ 2.75% | 50 | 32.81 | 23.62 |
| 13 | CMC 9H4F | Guar Gum 5.3% | $Al_2(SO_4)_3$ 2.6%, Tyzor TE 4.2% | 43.92 | 24.46 | 23.17 |
| 14 | CMC 9H4F | Guar Gum 5.8% | $Al_2(SO_4)_3$ 1.8%, Tyzor TE 4.2% | 55.58 | 24.46 | 26.4 |
| 15 | CMC 9H4F | Guar Gum 5.9% | $Al_2(SO_4)_3$ 1.0%, Tyzor TE 4.3% | 72.93 | 39.47 | 25.4 |
| 16 | CMC 9H4F | Guar Gum 5.1% | $Al_2(SO_4)_3$ 2.5%, Tyzor TE 6.8% | 46.71 | 52.01 | 22.62 |
| 17 | CMC 9H4F | LB Gum 5.4% | $Al_2(SO_4)_3$ 2.72%, $B(OH)_3$ 0.9% | 44.62 | 25.09 | 27.66 |
| 18 | CMC 9H4F | LB Gum 5.4% | $Al_2(SO_4)_3$ 1.83%, $B(OH)_3$ 0.9% | 46.15 | 28.28 | 27.57 |
| 19 | CMC 9H4F | LB Gum 5.4% | $Al_2(SO_4)_3$ 0.9%, $B(OH)_3$ 0.9% | 54.91 | 37.93 | 29.13 |
| 20 | CMC 9H4F | LB Gum 5.4% | $Al_2(SO_4)_3$ 2.75% | 47.12 | 27.72 | 28.26 |
| 21 | CMC 9H4F | LB Gum 5.4% | (AZC) Zr 1.36%, $B(OH)_3$ 1.8% | 52.13 | 35.37 | 31.88 |
| 22 | CMC 9H4F | LB Gum 5.4% | (AZC) Zr 1.35%, $B(OH)_3$ 2.7% | 53.64 | 36.59 | 31.15 |
| 23 | CMC 9H4F | LB Gum 5.4% | (AZC) Zr 2.72%, $B(OH)_3$ 0.9% | 35.58 | 19.56 | 28.8 |
| 24 | CMC 9H4F | LB Gum 5.4% | (AZC) Zr 2.75% | 37.59 | 19.74 | 28.91 |
| 25 | CMC 9H4F | LB Gum 5.4% | (AZC) Zr 2% | 44.79 | 26.6 | 26.6 |
| 26 | CMC 9H4F | LB Gum 5.4% | Al Acetate/Boric acid 2% | 36.41 | 18.33 | 26.66 |
| 27 | CMC 9H4F | LB Gum 5.4% | Al Acetate/Boric acid 3% | 30.36 | 13.57 | 26.06 |
| 28 | CMC 9H4F | LB Gum 5.4% | Al Acetate/Boric acid 5% | 30.17 | 12.74 | 23.46 |
| 29 | CMC 9H4F | LB Gum 5.4% | Al Acetate/Boric acid 0.25% | 70.12 | 54.1 | 31.46 |
| 30 | CMC 9H4F | LB Gum 5.4% | Al Acetate/Boric acid 0.5% | 57.96 | 40.74 | 29.37 |
| 31 | CMC 9H4F | LB Gum 5.4% | Al Acetate/Boric acid 1% | 50.24 | 29.48 | 30.24 |
| 32 | CMC 9H4F | LB Gum 5.4% | Al Acetate/Boric acid 1.5% NS | 43.73 | 24.23 | 27.55 |
| 33 | PA-CMC | Guar Gum 5.4% | $Al_2(SO_4)_3$ 2.72%, $B(OH)_3$ 0.9% | 32.74 | 14.43 | 29.44 |
| 34 | PA-CMC | Guar Gum 5.4% | $Al_2(SO_4)_3$ 1.83%, $B(OH)_3$ 0.9% | 39.84 | 19.44 | 27.64 |
| 35 | PA-CMC | Guar Gum 5.4% | $Al_2(SO_4)_3$ 0.9%, $B(OH)_3$ 0.9% | 49 | 30.12 | 25.73 |
| 36 | PA-CMC | Guar Gum 5.4% | $Al_2(SO_4)_3$ 2.75% | 41.5 | 22.72 | 26.08 |
| 37 | PA-CMC | Guar Gum 5.4% | $Al_2(SO_4)_3$ 2.72%, $B(OH)_3$ 0.9% | 29.33 | 11.64 | 30.91 |
| 38 | PA-CMC | Guar Gum 5.4% | $Al_2(SO_4)_3$ 1.83%, $B(OH)_3$ 0.9% | 32.14 | 13.29 | 27.44 |
| 39 | PA-CMC | Guar Gum 5.4% | $Al_2(SO_4)_3$ 0.9%, $B(OH)_3$ 0.9% | 35.41 | 13.81 | 26 |
| 40 | PA-CMC | Guar Gum 5.4% | $Al_2(SO_4)_3$ 2.75% | 36.5 | 13.96 | 30.42 |
| 41 | PA-CMC | Guar Gum 5.4% | $Al_2(SO_4)_3$ 2.72%, $B(OH)_3$ 0.9% | 33.21 | 13.65 | 27.66 |
| 42 | PA-CMC | Guar Gum 5.4% | $Al_2(SO_4)_3$ 1.83%, $B(OH)_3$ 0.9% | 36.21 | 16.43 | 28.13 |
| 43 | PA-CMC | Guar Gum 5.4% | $Al_2(SO_4)_3$ 0.9%, $B(OH)_3$ 0.9% | 47.45 | 26.51 | 27.06 |
| 44 | PA-CMC | Guar Gum 5.4% | $Al_2(SO_4)_3$ 2.75% | 41.12 | 19.08 | 28.02 |
| 45 | PA-CMC | Guar Gum 5.5% | (AZC) Zr 1.0%, $B(OH)_3$ 0.9% | 61.36 | 46.48 | 26.82 |
| 46 | PA-CMC | Guar Gum 5.5% | (AZC) Zr 1.5%, $B(OH)_3$ 0.9% | 58.7 | 43.08 | 24.84 |
| 47 | PA-CMC | Guar Gum 5.5% | (AZC) Zr 2.0%, $B(OH)_3$ 0.9% | 58.48 | 41.21 | 28.68 |
| 48 | PA-CMC | Guar Gum 5.5% | (AZC) Zr 2.5%, $B(OH)_3$ 0.9% | 40.26 | 23.83 | 25.95 |
| 49 | PA-CMC | Guar Gum 5.4% | $Al_2(SO_4)_3$ 2.72%, $B(OH)_3$ 0.9% | 64.35 | 49.81 | 25.8 |
| 50 | PA-CMC | Guar Gum 5.4% | $Al_2(SO_4)_3$ 1.83%, $B(OH)_3$ 0.9% | 68.85 | 54.48 | 24.06 |
| 51 | PA-CMC | Guar Gum 5.4% | $Al_2(SO_4)_3$ 0.9%, $B(OH)_3$ 0.9% | 75.38 | 56.35 | 22.86 |
| 52 | PA-CMC | Guar Gum 5.4% | $Al_2(SO_4)_3$ 2.75% | 50.54 | 33.92 | 26.35 |

While illustrative embodiments have been illustrated and described, it will be appreciated that various changes can be made therein without departing from the spirit and scope of the invention.

The embodiments of the invention in which an exclusive property or privilege is claimed are defined as follows:

1. Particles comprising a combination of a carboxyalkyl cellulose and a galactomannan polymer or a glucomannan polymer, wherein the particles comprise a plurality of non-permanent metal crosslinks and wherein the particles do not have permanent crosslinks.

2. The particles of claim 1, wherein the carboxyalkyl cellulose has a degree of carboxyl group substitution of from about 0.3 to about 2.5.

3. The particles of claim 1, wherein the carboxyalkyl cellulose is carboxymethyl cellulose.

4. The particles of claim 1, wherein the galactomannan polymer is selected from the group consisting of guar gum, locust bean gum, and tarn gum.

5. The particles of claim 1, wherein the glucomannan polymer is konjac gum.

6. The particles of claim 1, wherein the galactomannan polymer or glucomannan polymer is present in an amount from about 1 to about 20 percent by weight based on the total weight of the particles.

7. The particles of claim 1, wherein the carboxyalkyl cellulose is present in an amount from about 60 to about 99 percent based on the total weight of particles.

8. The particles of claim 1, wherein the non-permanent metal crosslinks comprise multi-valent metal ion crosslinks.

9. The particles of claim 1, wherein the non-permanent metal crosslinks comprise one or more metal ions selected from the group consisting of aluminum, boron, bismuth, titanium, and zirconium, and mixtures thereof.

10. The particles of claim 1 having a free swell capacity of from about 30 to about 60 g/g for 0.9% saline solution.

11. The particles of claim 1 having a centrifuge retention capacity of from about 15 to about 35 g/g for 0.9% saline solution.

12. The particles of claim 1 having an absorbency under load capacity of from about 15 to about 30 g/g for 0.9% saline solution.

13. The particles of claim 1 having a size less than about 800 μm.

* * * * *

UNITED STATES PATENT AND TRADEMARK OFFICE
CERTIFICATE OF CORRECTION

PATENT NO. : 7,785,710 B2
APPLICATION NO. : 11/537896
DATED : August 31, 2010
INVENTOR(S) : S. Ananda Weerawarna, Mengkui Luo and Alena Michalek It is certified that error appears in the above-identified patent and that said Letters Patent is hereby corrected as shown below:

Col. 11, line 19 should read as follows::

... locust bean gum, and tara gum. ...

The word "tarn" should be changed to "tara".

Signed and Sealed this

Sixteenth Day of November, 2010

David J. Kappos
*Director of the United States Patent and Trademark Office*